US011386087B2

(12) United States Patent
Eich et al.

(10) Patent No.: US 11,386,087 B2
(45) Date of Patent: Jul. 12, 2022

(54) BENCHMARK FRAMEWORK FOR COST-MODEL CALIBRATION

(71) Applicant: SAP SE, Walldorf (DE)

(72) Inventors: Marius Eich, Neustadt (DE); Dennis Felsing, Leimen (DE)

(73) Assignee: SAP SE, Walldorf (DE)

( * ) Notice: Subject to any disclaimer, the term of this patent is extended or adjusted under 35 U.S.C. 154(b) by 407 days.

(21) Appl. No.: 16/374,521

(22) Filed: Apr. 3, 2019

(65) Prior Publication Data

US 2020/0320078 A1    Oct. 8, 2020

(51) Int. Cl.
*G06F 16/245* (2019.01)
*G06F 16/2453* (2019.01)

(52) U.S. Cl.
CPC .............................. *G06F 16/24545* (2019.01)

(58) Field of Classification Search
CPC ............... G06F 16/24545; G06F 16/24; G06F 16/2453; G06F 16/24542
See application file for complete search history.

(56) References Cited

U.S. PATENT DOCUMENTS

| 9,720,732 | B1* | 8/2017 | Shih | G06F 9/50 |
| 2010/0030758 | A1* | 2/2010 | Belknap | G06F 16/217 707/718 |
| 2010/0241827 | A1* | 9/2010 | Yu | G06F 8/314 712/30 |
| 2010/0241828 | A1* | 9/2010 | Yu | H04L 12/44 712/30 |
| 2014/0229221 | A1* | 8/2014 | Shih | G06F 9/5038 705/7.23 |
| 2015/0149441 | A1* | 5/2015 | Nica | G06F 16/24542 707/719 |
| 2015/0310066 | A1* | 10/2015 | Beavin | G06F 16/24542 707/716 |
| 2015/0379429 | A1* | 12/2015 | Lee | G06N 20/00 706/11 |
| 2017/0124151 | A1* | 5/2017 | Ji | G06F 16/24542 |
| 2018/0081645 | A1* | 3/2018 | Alurralde Iturri | G06F 8/38 |

* cited by examiner

*Primary Examiner* — Kris E Mackes
*Assistant Examiner* — Tiffany Thuy Bui
(74) *Attorney, Agent, or Firm* — Mintz Levin Cohn Ferris Glovsky and Popeo, P.C.

(57) ABSTRACT

In some aspects, there is provided a method including receiving an execution plan file, the execution plan file utilizing at least one operator of interest and further utilizing other actions separate from the at least one operator of interest. The method further includes forming an execution plan object by modifying the execution plan file by isolating the at least one operator of interest from the other actions. The method further includes performing a series of tests executing an extended execution plan object. The series of tests can include receiving the input data identified by the one or more pointers in the extended execution plan object, executing the extended execution plan object using the received input data, measuring, based on the execution of the extended execution plan object, at least one cost metric representative of execution of the at least one operator of interest, and outputting the measured cost metric.

16 Claims, 6 Drawing Sheets

```
300
01: {
02:     "query": {
03:         "__type__": "hex::operators::HashJoin",         — 310
04:         "m_children": [{                                 — 315A
05:             "__type__": "hex::operators::DummyData"
06:         },
07:         {                                                — 315B
08:             "__type__": "hex::operators::DummyData"
09:         }],
10:         "m_collectValueExprs": [{                        — 320
11:             "__type__": "hex::plangen::Field",
12:             "m_relId": 0,
13:             "m_relColId": 0,                             — 330A
14:             "m_resultType": "PH_RESULTTYPE"
15:         }],                                              — 325
16:         "m_lookupValueExprs": [{
17:             "__type__": "hex::plangen::Field",
18:             "m_relId": 1,
19:             "m_relColId": 0,                             — 330B
20:             "m_resultType": "PH_RESULTTYPE"
21:         }],                                              — 330C
22:         "m_joinType": "PH_JOINTYPE",
23:         ...
24:     }
25: }
```

BENCHMARK FRAMEWORK FOR COST-MODEL CALIBRATION

TECHNICAL FIELD

The subject matter described herein relates to database management, and more particularly, cost-based optimization for query execution planning.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time.

Query execution engines may use an optimizer to find the optimal execution plans for database queries. This may involve the ordering of operators and the selection of the best-fitting implementation for each of these operators. To come up with such an optimal execution plan, a thorough investigation of each operator's performance characteristics is needed. The gathered information can then be used as the basis for a linear regression analysis to derive a mathematical model predicting the operator's performance.

Optimization typically relies on a collection of precise performance information for each operator. One approach for collecting this performance information would be to run a certain set of queries involving the operators of interest on a certain set of input data via an SQL interface of the database system and measure the execution time of these queries. This approach has a number of drawbacks, which render it basically useless for execution plan optimization.

SUMMARY

In some aspects, there is provided a system including at least one data processor; and at least one memory storing instructions which, when executed by the at least one data processor, result in operations including receiving an execution plan file, the execution plan file utilizing at least one operator of interest and further utilizing other actions separate from the at least one operator of interest. The operations further include forming, based on the execution plan file, an execution plan object by modifying the execution plan file by isolating the at least one operator of interest from the other actions; performing a series of tests executing an extended execution plan object, the extended execution plan object formed by modifying one or more dummy operators in the execution plan object to include pointers identifying input data. The series of tests include receiving the input data identified by the one or more pointers in the extended execution plan object, executing the extended execution plan object using the received input data, and measuring, based on the execution of the extended execution plan object, at least one cost metric representative of execution of the at least one operator of interest; and outputting the measured cost metric.

In some variations, the operations can further include one or more features disclosed herein including the following. Forming the extended execution plan object can include deserializing the execution plan file. Modifying the execution plan file can include replacing one or more of the other actions with one or more of at least one pointer identifying input data and one or more dummy operators. Replacing the one or more other actions can include replacing a table scan with the at least one pointer identifying the input data. Replacing the one or more other actions can include replacing a projection operator with a dummy projection operator that receives data produced by the operator of interest. The cost metric can be execution time of the extended execution plan object. The operations can further include generating the input data using a random number generator. The operations can further include determining, based on the at least one output cost metric, a cost-model for the operator of interest based on the measured cost metric. The system can further include a database execution engine; a benchmark framework communicatively coupled to the database execution engine; and one or more databases, where the benchmark framework receives the execution plan file, and forms the extended execution plan object, the benchmark framework performs the series of tests and outputs the measured cost metric, the input data is received from the one or more databases, and the benchmark framework determines the cost-model for the operator of interest based on the measured cost metric. The system can further include a cost-based optimizer communicatively coupled to the database execution engine and configured to perform operations including receiving a query request, compiling the received query request into an initial execution plan, using the compiled execution plan, identifying database parameters associated with the received query request, identifying, based on the identified database parameters and using one or more cost-models associated with one or more operators of interest associated with the received query request, an optimum version of the one or more operators of interest to execute the query, and executing the received query request using the identified optimum version.

In some aspects, there is provided a computer program product including a non-transitory machine-readable medium storing instructions that, when executed by at least one programmable processor, cause the at least one programmable processor to perform operations including receiving an execution plan file, the execution plan file utilizing at least one operator of interest and further utilizing other actions separate from the at least one operator of interest, forming, based on the execution plan file, an execution plan object by modifying the execution plan file by isolating the at least one operator of interest from the other actions, performing a series of tests executing an extended execution plan object, the extended execution plan object formed by modifying one or more dummy operators in the execution plan object to include pointers identifying input data. The series of tests include receiving the input data identified by the one or more pointers in the extended execution plan object, executing the extended execution plan object using the received input data, measuring, based on the execution of the extended execution plan object, at least one cost metric representative of execution of the at least one operator of interest, and outputting the measured cost metric.

In some variations, the operations can further include one or more features disclosed herein including the following. Forming the extended execution plan object can include deserializing the execution plan file. Modifying the execution plan file can include replacing one or more of the other actions with one or more of at least one pointer identifying input data and one or more dummy operators. Replacing the one or more other actions can include replacing a table scan with the at least one pointer identifying the input data. Replacing the one or more other actions can include replacing a projection operator with a dummy projection operator that receives data produced by the operator of interest.

In some aspects, there is provided a method including receiving an execution plan file, the execution plan file utilizing at least one operator of interest and further utilizing other actions separate from the at least one operator of interest, forming, based on the execution plan file, an execution plan object by modifying the execution plan file by isolating the at least one operator of interest from the other actions, performing a series of tests executing an extended execution plan object, the extended execution plan object formed by modifying one or more dummy operators in the execution plan object to include pointers identifying input data. The series of tests can include receiving the input data identified by the one or more pointers in the extended execution plan object, executing the extended execution plan object using the received input data, measuring, based on the execution of the extended execution plan object, at least one cost metric representative of execution of the at least one operator of interest, and outputting the measured cost metric.

The cost metric can be execution time of the extended execution plan object. The method can further include generating the input data using a random number generator. The method can further include determining, based on the at least one output cost metric, a cost-model for the operator of interest based on the measured cost metric. Replacing the one or more other actions can include replacing a projection operator with a dummy projection operator that receives data produced by the operator of interest.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In some example embodiments, a cost-based optimizer is used to find an optimal execution plan for performing database queries. The cost-based optimizer utilizes a cost model, which allows for predicting the "cost" of applying a certain operator implementation at a certain position in the execution plan. In various example embodiments, cost can be a performance metric, such as execution time, memory consumption, etc. The cost-based optimizer selects the "least costly" plan according to the cost model and passes it to an execution framework to be executed.

Running a complete query may involve a lot of overhead which is included in most cost-based measurements of the actual database query. The overhead cannot be separated from the cost information of an operator implementation of interest that is being optimized. For example, if one is only interested in the execution time of a join operator for two tables of certain input sizes, running a query with a join operator will inevitably also involve the execution of two table scans, which will consume an unknown portion of the execution time of the query. For some example embodiments of the cost-model used by the cost-based optimizer described herein, it is desirable to have a cost measurement only for the join operator itself, since the cost-based optimizer is only interested in the cost of the one or more individual operators being optimized.

Controlling the execution plan resulting from running a SQL query is difficult. For example, if one is interested in the performance of a certain implementation of a join operator, it may not be possible to control the database system not to use any other join implementation for the execution of the respective SQL query. In typical database systems, the decision of what specific join implementation to use is intentionally hidden from the user interface and not necessarily meant to be influenced by the user.

To get meaningful cost measurement numbers, a rather large set of input parameter combinations is needed. For example, a user might be interested in the runtime measurements of a scan operator for table sizes ranging from 1 to 1,000,000,000 rows in relatively small increments, say 10,000 rows. Collecting this information in the database system itself would involve the creation of a large number of tables with the desired table sizes and the insertion of data into these tables. For example, 100,000 tables would be needed to provide table sizes ranging from 1 to 1,000,000,000 rows in increments of 10,000 rows.

To overcome these problems, a benchmark framework allowing for measuring the execution times of select operators by a database execution engine for an arbitrary set of determinant parameters in an easy-to-use manner has been developed. The benchmark framework makes use of one or more benchmark libraries of operators, which provide all the tools necessary for automatic generation of input parameter values and reliable measurement of a cost metric. In some example embodiments, the input to the benchmark framework is a JSON-file encoding the query execution plan containing the operator of interest to be optimized. The JSON-file is deserialized into an execution plan object designed to be executed by the database execution engine. This provides the user with full control over what exactly is executed in the execution plan and for which operator or operators cost is/are measured.

The input data used for the optimization testing is, in some example embodiments, provided by providing the execution plan object with "dummy" or "placeholder" operators (e.g., dummy scan operators) that simply pass the input data to the operator of interest without any significant overhead. This allows for isolating the cost of executing the operator of interest from other superfluous operations that surround the operator of interest in a regular execution.

Using the benchmark framework described herein, it is possible to collect precise cost data on the performance of a certain select operator or operators subject to a wide range of influence factors (e.g., a number of distinct values in a number of rows or columns, or a selectivity of an operator predicate) which can then be input into the cost-model to be used by the cost-based optimizer. In some example embodiments, the cost data is determined using standard statistical analysis software of a number of cost measurements. Conducting these cost-based performance tests does not require a running instance of the database system. The entire process can be automated to develop and/or update the cost-model describing the performance of the select operator whenever the characteristics of an operator change during ongoing development.

In some example embodiments, the cost-based benchmark framework provides the following enhanced features:

The system is easy to use and does not require a running instance of a database system. In some example embodiments, the system works similarly to a unit test, which only requires the compilation of the code that is executed (in this case code executed by the database execution engine), but not that executed by the whole database system.

The process of running the benchmark generated tests can be automated within a build structure of the database execution engine and can done on a recurring basis to re-calibrate the cost-model during ongoing development.

The benchmark framework provides full control over which operators are executed and on specified input data. The input data can be generated for each operator execution and the input characteristics (e.g., distribution, value range, etc.) are controlled by the user.

One or more selected operators can be analyzed in isolation. The results are not blurred by the effects of other operators that are typically contained in a regular query execution plan, such as table scans at the leaves of an operator tree and/or a projection at the root of the operator tree.

The results can be provided in a format that may be processed by standard statistics software to derive cost-formulas for the respective operators (e.g., using CSV or JSON).

In some example embodiments, there may be provided an execution engine that may decouple a higher-level, application layer from a lower database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

Figure 1:
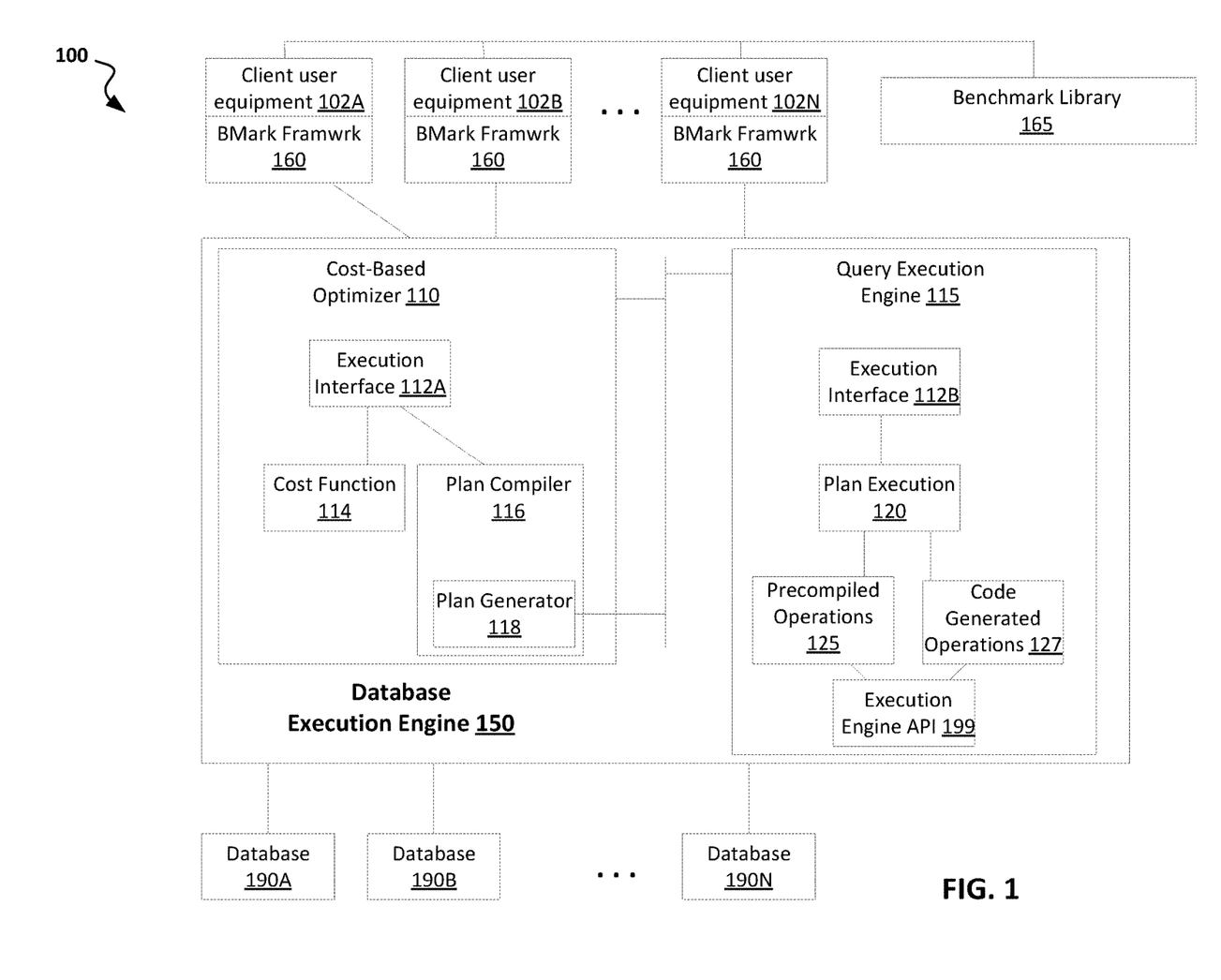
FIG. 1 depicts a block diagram for a system, in accordance with some example embodiments.

FIG. 1 shows a block diagram of an example embodiment of a system 100, in accordance with some example implementations.

The system 100 may include one or more client user equipment 102A-N, such as a computer, a smart phone, a tablet, an Internet of Things (IoT) device, and/or other computer or processor-based devices. The client user equipment 102 may include a user interface, such as a browser or other application to enable access to one or more applications, database layer(s), and/or databases, to generate queries to one or more databases 190A-N, and/or to receive responses to those queries.

In the example of FIG. 1, the databases 190A-N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, client user equipment 102A-N may send a query plan describing an execution plan including one or more operators to a database execution engine 150. The database execution engine 150 may send the query plan to the database layer 190A-B, which may represent a persistence and/or storage layer where database tables may be stored and/or queried. The query plan may be sent via a connection, such as a wired and/or wireless connection (e.g., the Internet, cellular links, WiFi links, and/or the like).

The database execution engine 150 may include a cost-based optimizer 110, such as a SQL optimizer and/or another type of optimizer, to receive at least one query from a user equipment 102 and generate a query plan (which may be optimized) for execution by the execution engine 112. The cost based optimizer 110 may receive a request, such as a query request, and then form or compile the received query request into an initial execution plan. The cost-based optimizer 110 may then identify database parameters associated with an operator of interest in the received query request. The database parameters may include one or more of a number of rows, a number of columns, a number of distinct values for each column, and a selectivity of an operator predicate, for which cost-models for the operator of interest have been previously generated. Using the identified database parameters and one or more cost-models, the cost-based optimizer may identify an optimum version of the operator of interest to execute the query request. The execution engine 150 may then execute the received query request using the identified optimum version. Further details of the cost-based optimization of the operators of interest are described below.

For example, SELECT Columns from Table A and Table B, and perform an INNER JOIN on Tables A and B may represent a query received by the database execution engine 150 including the cost-based optimizer 110. There may be several ways of implementing execution of this query. As such, the query plan may offer hints or propose an optimum query plan with respect to the execution time of the overall query. To optimize a query, the cost-based optimizer 110 may obtain one or more costs for the different ways of executing of the query plan. The costs may be obtained via the execution interface 112A from a cost function 114, which responds to the cost-based optimizer 110 with the cost(s) for a given query plan (or portion thereof), and these costs may be in terms of execution time at the database layer 190A-N, for example.

The cost-based optimizer 110 may form an optimum query plan, which may represent a query algebra, as noted above. To compile a query plan, the cost-based optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler 116 may select pre-compiled code for a given operation as part of the optimization of the query plan, while for another operation in the query plan the plan compiler 116 may allow a compiler to generate the code. The pre-compiled and generated code represent code for executing the query plan, and this code may be provided to the plan generator 118, which interfaces with the query execution engine 115.

In some implementations, the cost-based optimizer 110 may optimize the query plan by compiling and generating code. Moreover, the cost-based optimizer 110 may optimize the query plan to enable pipelining during execution.

The query execution engine 115 may receive, from the plan generator 118, compiled code to enable execution of the optimized query plan, although the query execution engine may also receive code or other commands directly from a higher-level application or other device, such as user equipment 102A-N.

The query execution engine 115 may then forward, via an execution interface 112B, the code to a plan execution engine 120. The plan execution engine 120 may then prepare the plan for execution, and this query plan may include pre-compiled code 125 and/or generated code 127. When the code for the query plan is ready for execution during runtime, the query execution engine 115 may step through the code performing some of the operations within the database execution engine 150 and sending some of the operations (or commands in support of an operation, such as a read, write, and/or the like) to an execution engine application programming interface (API) 199 for execution at one or more of databases layers 190A-N.

In some example embodiments, the user equipment 102A-102N is connected to or can operate directly a benchmark framework 160. The benchmark framework 160 may be connected to a benchmark library 165 via a connection, such as a wired and/or wireless connection (e.g., the Internet, cellular links, WiFi links, and/or the like). In some embodiments, the benchmark library 165 may be local to the user equipment 102A-102N. The benchmark framework 160 allows for measuring one or more cost metrics (e.g., the execution time, memory allocation, etc.) of select operators for an arbitrary set of determinant parameters.

The benchmark framework 160 makes use of one or more benchmark libraries 165 of operators, which provide all the tools necessary for automatic generation of input parameter values and reliable measurement of the cost metric. In some example embodiments, the input to the benchmark framework 160 is a JSON-file encoding the query execution plan containing the operator of interest to be analyzed to form the cost-model. The JSON-file is deserialized into an execution plan object designed to be executed by the database execution engine 150. This provides a user of one of the client user equipment 102 with full control over what exactly is executed in the execution plan and for which operator or operators the cost metric is/are measured in developing the cost-model.

Figure 2:
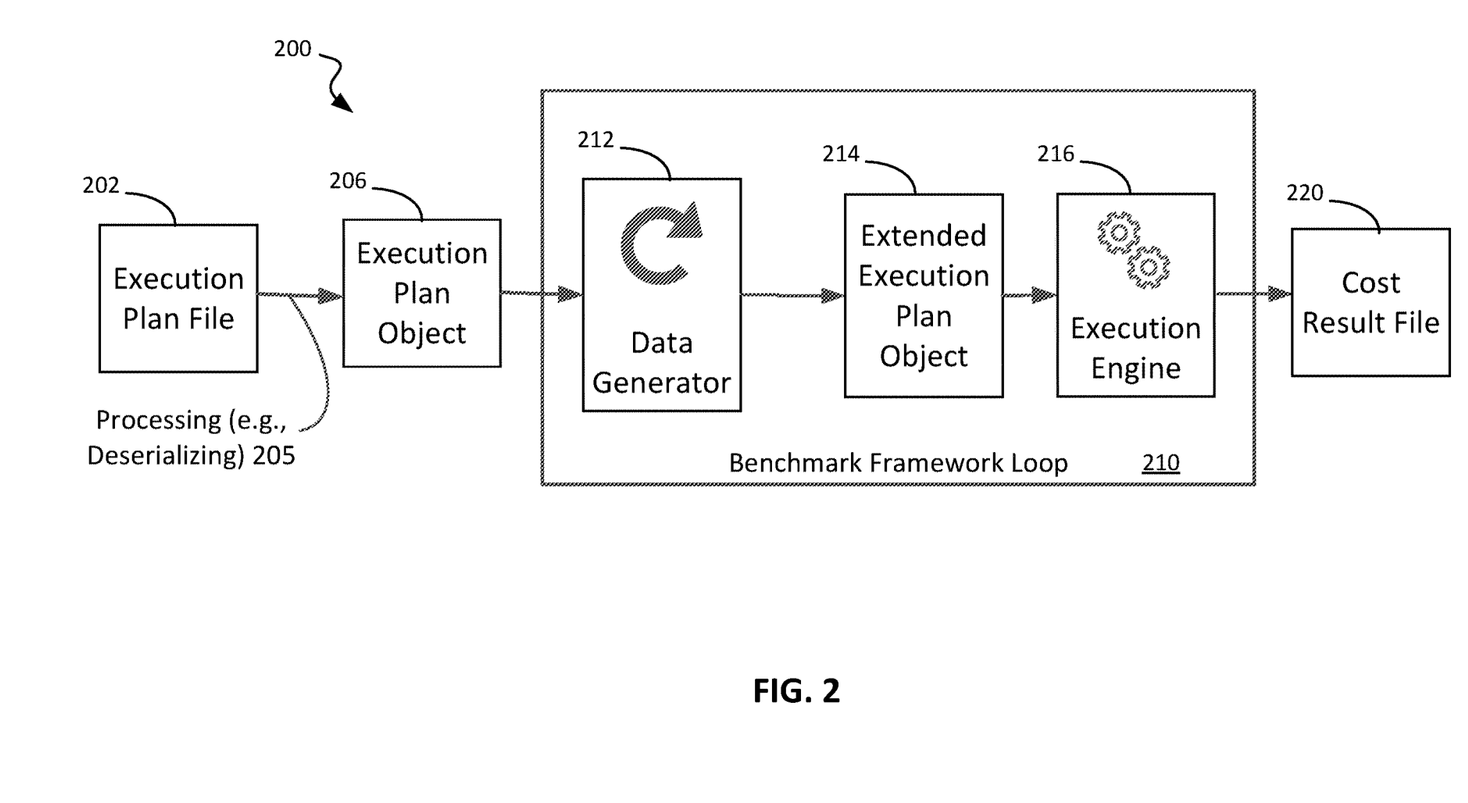
FIG. 2 depicts an example embodiment of a high-level flow diagram of a benchmark framework loop process for determining a cost model of one or more operators of interest contained in an execution plan.

FIG. 2 shows an example embodiment of a high-level flow diagram of a benchmark framework loop process 200 for determining a cost-model of one or more operators of interest contained in an execution plan.

The process 200 starts with the benchmark framework 160 receiving, as an input (e.g., from a user of client user equipment 102A-102N), an execution plan file (e.g., a JSON file) 202 that includes an encoding of a query plan directed at one or more of the databases 190A to 190N. The execution plan file 202 contains information needed by the execution engine 150 to generate an execution plan object 206, including the one or more operators of interest to be optimized by the cost-based optimizer 110. The execution plan file 202 also contains expressions (e.g., predicates, field expressions, etc.) utilized by the query execution engine 115 to execute the query plan represented by the execution plan file 202.

Upon receiving the execution plan file 202, the benchmark framework may form an execution plan object 206 by processing (e.g., deserializing) 205 the execution plan file 202. In some example embodiments, the processing 205 of the execution plan file 202 into the execution plan object 206 includes converting a JSON execution plan file 202 into an object in memory. The processing 205 may include, in some example embodiments, the construction of an object in memory that contains all the information that is also contained in the execution plan file 202. In general, no information is added or modified during the processing 205. However, various placeholder strings may be replaced by other strings during the processing 205. The execution plan file 202 is a representation of an in-memory object which can be persistently stored on disk in contrast to a volatile in-memory representation. The benchmark framework 160 modifies the execution plan object 206 by isolating the operators of interest from other superfluous actions (e.g., other operators, scans, projections, etc.) that consume overhead separate from the operators of interest. Before the execution plan object 206 is executed, the execution plan object 206 is further processed by adding one or more data sources as leaf nodes of an operator tree structure representing the execution plan object 206. The benchmark framework 160 revises the execution plan object 206 by representing table scans included in the execution plan file 202 with operators (referred to as DummyData) resulting in an extended execution plan object 214. In some example embodiments, pointers to the input data are held by the DummyData operators. The previously generated input data resides in memory and can be directly streamed to the one or more operators of interest when under test in a benchmark framework loop process 210.

In some example embodiments, the input data used to fill tables being operated on by the operator(s) of interest is generated on the fly by a data generator 212 of the benchmark framework 150 for each execution in the benchmark framework loop process 210 according to parameters specified by a user (e.g., of one of the client user equipment 102A to 102N). In this way, the input data does not have to be stored in a file on disk. Typical examples for the user specified parameters may include a number of rows, a number of columns, a number of distinct values for each column, a selectivity of an operator predicate, etc. Selectivity is a probability that any row will satisfy a predicate. For example, a selectivity of 0.01 (1%) for a predicate operating on a table with 1,000,000 rows means that the predicate will return an estimated 10,000 rows and discard an estimated 990,000 rows. The specified parameters later become independent variables of the cost-function 114 employed by the cost-based optimizer 110. In contrast to an actual table scan, which typically makes use of some more complex data structures and comprises a separate materialization step, the streaming of input data using the pointers of the DummyData causes no significant overhead, thus not affecting the cost-function 114.

The input data used to fill the tables utilized by the operators of interest may be generated by the data generator 212 using a random number generator, in some example embodiments. This provides a fast and simple way to fill tables of various sizes according to the input parameters specified by the user.

Before executing the extended execution plan object 214, the benchmark framework 160 further revises the execution plan object 206 by replacing one or more projection operators with one or more "dummy" projection operators added at a root of the operator tree structure. When being executed, the dummy projection operators receive the data produced by the operator of interest under test and basically ignore the received data. In an actual execution of the execution plan object 206, a projection operator buffers a query result and potentially applies a set of projection functions to it, which causes some overhead that are not to be included in the cost-metric measurements.

Having revised the execution plan object 206, as described above, to form the extended execution plan object 214, the extended execution plan object 214 is then passed to an execution engine 216 to be executed in the benchmark framework loop process 210. In some example embodiments, the execution engine 216 is the query execution engine 115.

The benchmark framework 160 runs a series of tests, represented by the benchmark framework loop process 210, using the tables filled with the random input data generated by the data generator 212 using a random number generator as described above. While running the series of tests, the benchmark framework 160 measures at least one cost metric (e.g., execution time, memory allocation, etc.) representative of execution of a candidate version of at least one operator of interest.

The benchmark framework 160 outputs the at least one measured cost metric for individual tests to a cost result file 220. In some example embodiments where execution time is the cost-metric, the time taken for the execution of individual tests is measured and communicated to and stored in the cost result file 220. In some example embodiments, the benchmark framework loop process 210 starting with generating the input data with the data generator 212 to executing the extended execution plan object 214 at the execution engine 210, measuring the cost metric and communicating and storing the measured cost metric in the cost result file 220 is conducted by the benchmark library 165 which provides a mechanism for running a series of benchmarks in benchmark framework loop 210 with varying input parameters. In this way, a plurality of cost-based experiments can be executed using the same extended execution plan object 214 repeatedly with a large number of different input sizes and data distributions while executing the benchmark framework loop process 210 just once.

Further processing of the outputted cost result file 220 can be provided using standard statistical software. An example cost result file 220 is described below. The cost-based optimizer 110 may identify, based on the at least one output cost metric, an optimum one of the plurality of candidate versions of the at least one operator of interest. The optimum candidate version of the operator of interest may be the candidate version that results in the lowest average measured execution time or the lowest memory allocation, for example.

Figure 3:
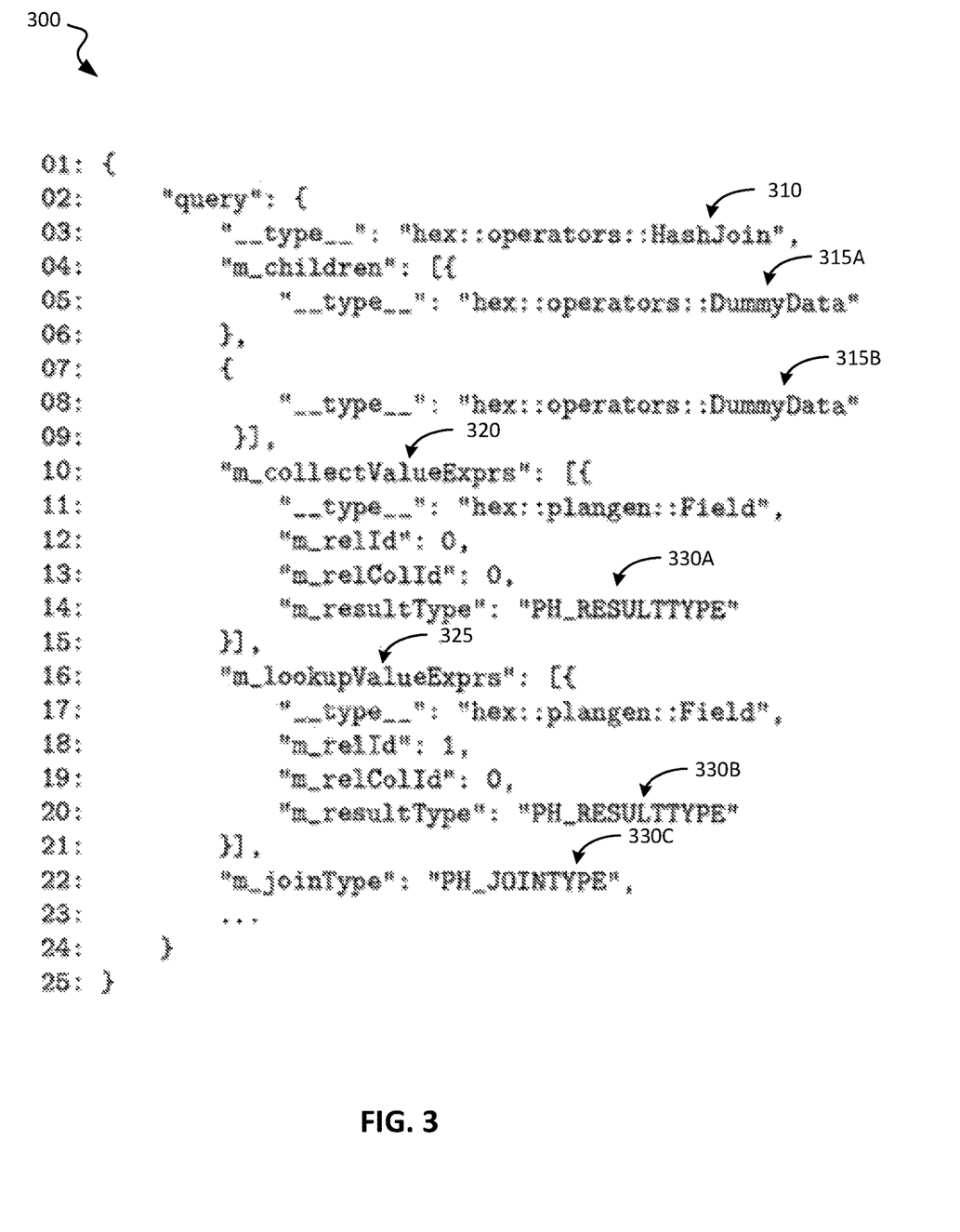
FIG. 3 depicts an example embodiment of an execution plan file that can be executed during tests using the benchmark framework loop process of FIG. 2.

FIG. 3 depicts an example embodiment of an execution plan file 300 (e.g., the execution plan file 202 of FIG. 2) that can be received from one of the user equipment 102A-102N and formed into the extended execution plan object file 214 executed during tests using the benchmark framework loop process 210 of FIG. 2. The execution plan file 300 encodes a query execution plan containing a hash-join operator 310 comprising lines 01-25.

The hash-join operator 310, in this example, is the operator of interest for which the benchmark framework loop process 210 will collect information needed to derive a cost-model. Lines 3 to 9 define children operators 315A and 315B of the hash-join operator 310. The children operators 315A and 315B are of the type DummyData as described above, which is a name for a data source operator. In the execution plan object file 300, the DummyData operators act as placeholders for the input data that are later created by the data generator 212 and inserted into the execution plan object file 300 before being executed in the benchmark framework loop process 210.

Lines 10-21 define a specification of a predicate of the hash-join' operator 310, including a collect expression 320 (the build side of the hash-join operator 310) and a lookup expression 325 (the probe side of the hash-join operator 310). Strings 330A, 330B and 330C with prefix "PH" (lines 14, 20 and 22) are placeholder strings that are later replaced by a different string during the processing 205. The strings are replaced during processing 205. They can be replaced by a string that has a certain meaning to the database execution engine 150. For example, "PH_JOINTYPE" may be replaced by one of the following specific strings: "Inner", "LeftOuter", "RightOuter", "FullOuter", "LeftSemi", "RightSemi", "LeftAntiSemi" or "RightAntiSemi." Similarly, there are a set of valid values for the data type of an operators result ("PH_RESULTTYPE" in line 14 of FIG. 3). So, the string placeholder mechanism, allows just one generic file for all supported join types and users do not have to create and store 8 different plan files, which only differ in the join type to cover all supported join types. This allows for further parameterization of the plan. In the example execution plan object file 300, the data type of the join result and the join type (e.g., inner, left outer, etc.) is not fixed in the execution plan object file 300. In this way, only one relatively generic execution plan object file 300 needs to be written and stored for all benchmark experiments involving a hash-join.

Table 1 shows an example of a CSV-file version of the cost result file 220 produced by the benchmark for a plan containing an inner hash join on integer columns. Each HashJoinINT entry contains the input parameter values including: a number of distinct values "lDistinct" in each row of a first (left) table, a number of rows "lRows" in the first table, a number of distinct values "rDistinct" in a second (right) table, a number of rows "rRows" in the second table, and a selectivity "sel." The input parameter values are used in the respective execution of each iteration resulting in output values for the cpu_time and real_time elapsed during the execution (e.g., in nanoseconds) for each iteration.

TABLE 1

| name | iteration | real_time | cpu_time | lDistinct | lRows | rDistinct | rRows | sel |
|---|---|---|---|---|---|---|---|---|
| HashJoinINT | 336227 | 2097.57 | 2097.64 | 1 | 1 | 1 | 1 | 1 |
| HashJoinINT | 334358 | 2099.28 | 2099.33 | 1 | 1 | 1 | 2 | 1 |
| HashJoinINT | 3405272 | 2089.94 | 2089.96 | 1 | 1 | 2 | 2 | 0.5 |
| ... | | | | | | | | |
| HashJoinINT | 95 | 7.36807e+06 | 7.3684e+06 | 2048 | 32768 | 8192 | 32768 | 1.2e−3 |
| HashJoinINT | 134 | 5.2212e+06 | 5.22132e+06 | 2048 | 32768 | 16384 | 32768 | 6.1e−4 |
| HashJoinINT | 171 | 4.11875e+06 | 4.11894e+06 | 2048 | 32768 | 32768 | 32768 | 3.1e−4 |
| ... | | | | | | | | |

The file format of Table 1 is exemplary and can be provided by the benchmark library 165, and can be used by the benchmark framework 160 when running the benchmark framework loop process 210 for a plurality of iterations. The iterations continue until the variance of the measurements of cpu_time reaches a certain lower bound, upon which the framework loop process 210 outputs the statistics (e.g., average and standard deviation) of all the iterations to the cost result file 220. This may guarantee meaningful numbers being output, because the first iteration typically acts as a "warmup" run for the following iterations and usually is much slower.

Figure 4A:
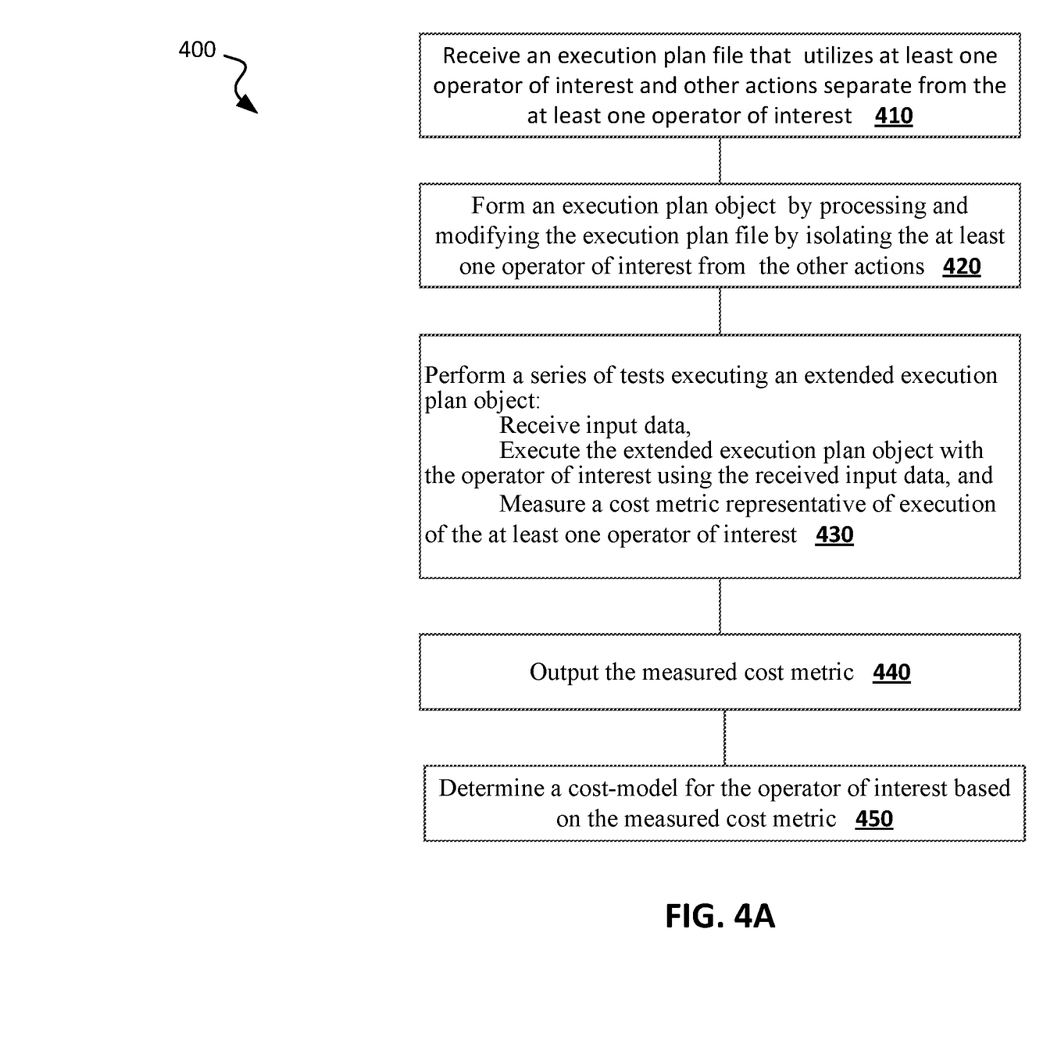
FIG. 4A depicts an example of a process for developing a cost-model for analyzing performance of an operator of interest, in accordance with some example embodiments.

FIG. 4A depicts an example process 400 for developing a cost-model for analyzing performance of an operator of interest, in accordance with some example embodiments.

At 410, an execution plan file may be received from a user. For example, the benchmark framework 160 may receive an execution plan file from user equipment 102A. The execution plan file utilizes at least one operator of interest and further utilizes other actions separate from the at least one operator of interest. The benchmark framework 160 may form, based on the execution plan file, an execution plan object at 420. For example, the benchmark framework 160 may modify the execution plan file by isolating the at least one operator of interest from the other actions.

At 420, the benchmark framework 160 may form the execution plan object by processing (e.g., deserializing) the execution plan file as described above. The benchmark framework 160 may replace one or more of the other actions with one or more operators including, for example, at least one DummyData operator including a pointer identifying input data and one or more other dummy operators (e.g., projections). The benchmark framework 160 may replace a table scan with at least one pointer to the input data. The benchmark framework may replace a projection operator with a dummy projection operator that receives data produced by the operator of interest. As discussed above, during this process, the benchmark framework 160 may replace placeholder strings in the execution plan file with various values of actual strings.

At 430, the benchmark framework 160 may perform a series of tests executing an extended execution plan object. The extended execution plan object may be formed by replacing the DummyData operators with the corresponding input data and adding one or more dummy projection operators to the in-memory object. The series of tests, in some example embodiments may include receiving the input data identified by the one or more pointers, executing the extended execution plan object using the received input data with the at least one operator of interest. The benchmark framework 160 may generate the input data using a random number generator as described above. The benchmark framework 160 may further measure, based on the execution of the extended execution plan object, at least one cost metric representative of execution of the at least one operator of interest. The benchmark framework 160 may output the measured cost metric at 440 to be received by the cost-based optimizer 110. The cost metric may be one or more of execution time and memory allocation of the extended execution plan object.

At 450, the benchmark framework 160 determines a cost-model for the tested operator of interest based on the at least one output measured cost metric. The cost-model may be generated using statistical analysis processes to generate curves to fit the variations in input parameters (e.g., a number of rows, a number of columns, a number of distinct values for each column, a selectivity of an operator predicate, etc.) for which the series of tests performed at 430 covered.

The process 400 may be repeated a number of times for different versions of the operator of interest in order to generate several cost-models related to the operator of interest.

Figure 4B:
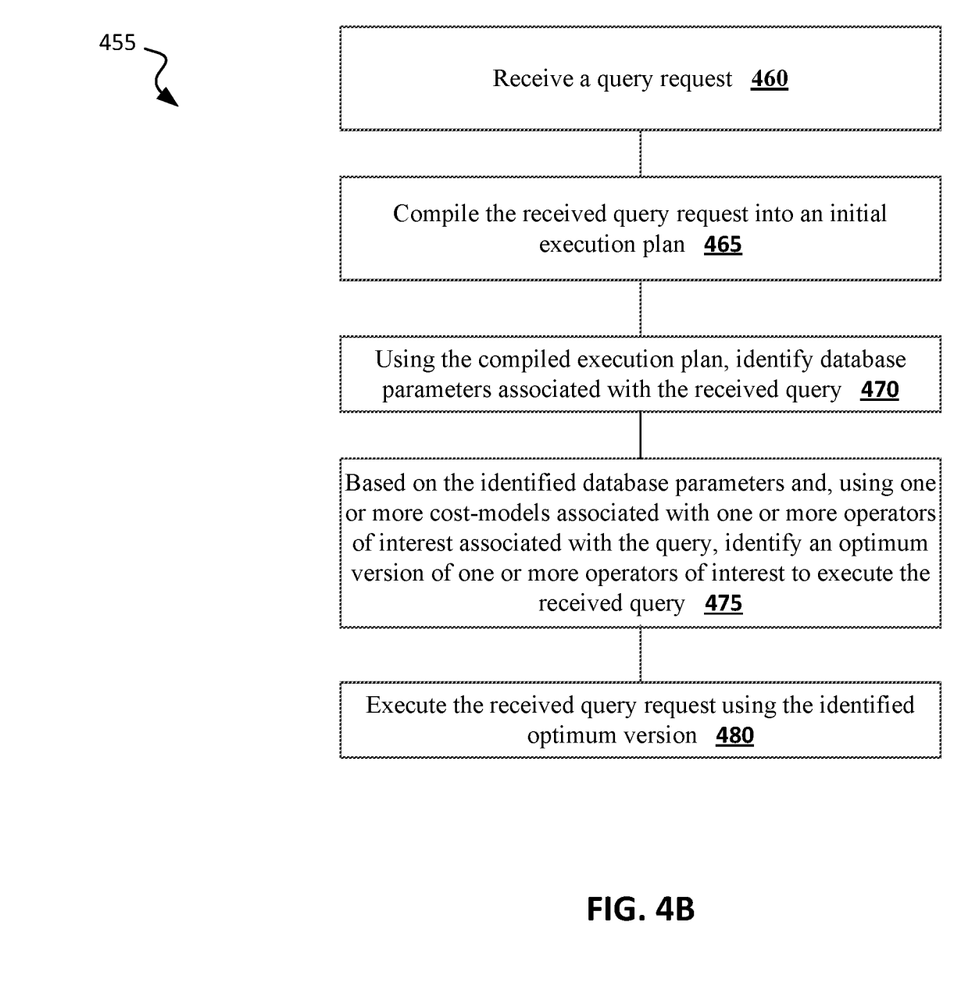
FIG. 4B depicts an example of a process for determining an optimum format to execute a query request, in accordance with some example embodiments.

FIG. 4B depicts an example of a process 455 for determining an optimum format to execute a query request, in accordance with some example embodiments. The process 455 may be executed by the cost-based optimizer 110.

At 460, the cost-based optimizer 110 receives a query request. The query request may be received from one of the user equipment 120A-120N. The query request will include one or more operators of interest for which one or more cost-models were generated using the process 400 of FIG. 4A.

At 465, the cost-based optimizer 110 compiles the received query request to form an initial execution plan. At 470, the cost-based optimizer 110 identifies, using the compiled initial execution plan, database parameters associated with the received query request. The database parameters may include one or more of a number of rows, a number of columns, a number of distinct values for each column, a selectivity of an operator predicate, for which the cost-models of the operator of interest were generated.

At 475, the cost-based optimizer 110 identifies, based on the identified database parameters and using one or more of the cost-models associated with the one or more operators of interest associated with the received query, an optimum version of the one or more operators of interest to execute the received query. The identified optimum version may be the version that, according to the cost-model, resulted in the lowest estimated execution time based on the identified database parameters associated with the received query request.

At 480, the received query request is executed, e.g., by the database execution engine, using the identified optimum version of the one or more operators of interest in the received query request.

Figure 5:
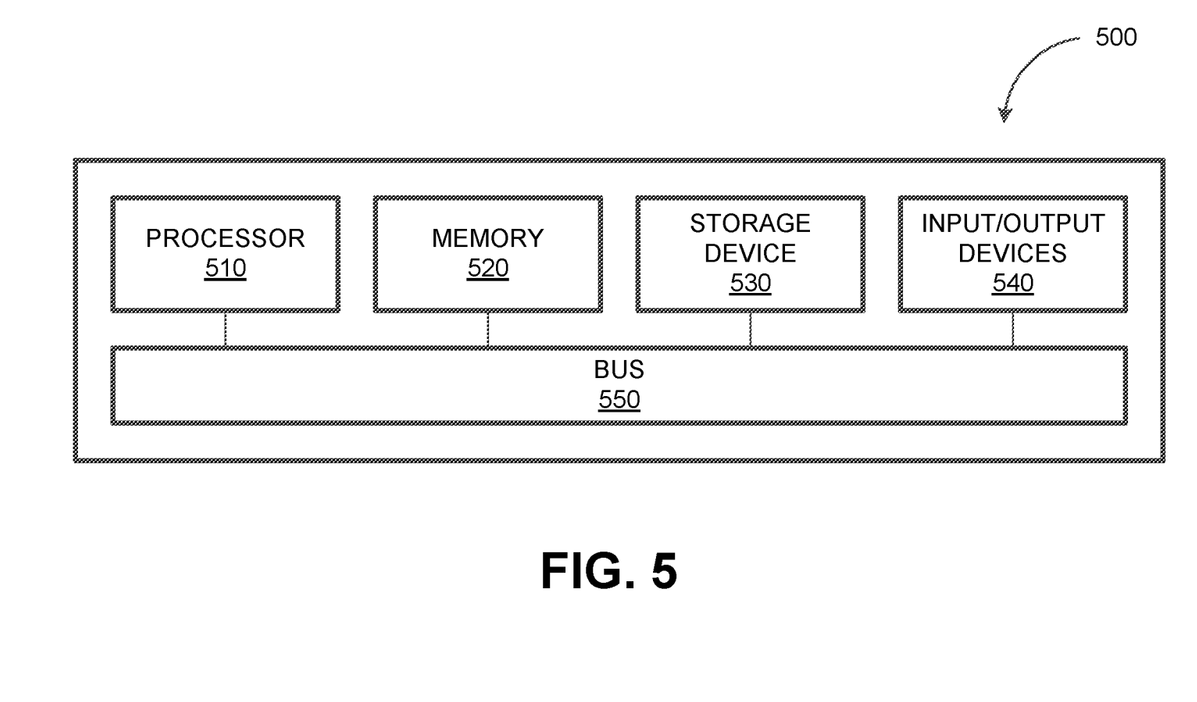
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the benchmark framework 160 and the database execution engine 150 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the data ingestion engine 120. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object database management systems, for example. The storage device 530 is capable of providing persistent storage for the computing system 500. The storage device 530 can be a floppy disk device, a hard disk device, an optical disk device, a solid-state device, a tape device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
      receiving an execution plan file that encodes a query execution plan for a database, the execution plan file utilizing at least one operator of interest to be isolated during testing and further utilizing other actions separate from the at least one operator of interest;
      forming, based on the execution plan file, an execution plan object by modifying the execution plan file, such that the at least one operator of interest is isolated from the other actions, wherein the modifying includes replacing at least one of the other actions corresponding to a table scan with a first dummy operator including at least one pointer identifying input data for the first dummy operator;
      performing a series of tests executing an extended execution plan object, the extended execution plan object formed by modifying one or more dummy operators in the execution plan object by replacing at least the at least one pointer with the input data, the series of tests comprising:
         receiving the input data identified by the at least one pointer in the extended execution plan object,
         executing the extended execution plan object using the received input data,
         measuring, based on the execution of the extended execution plan object, at least one cost metric representative of execution of the at least one operator of interest; and
         outputting the measured cost metric representative of execution of the at least one operator of interest at the database.

2. The system of claim 1, wherein forming the extended execution plan object further comprises deserializing the execution plan file.

3. The system of claim 1, wherein the modifying includes replacing at least another one of the other actions corresponding to a projection operator with a second dummy operator configured to receive data produced by the at least one operator of interest.

4. The system of claim 1, wherein the cost metric is execution time of the extended execution plan object.

5. The system of claim 1, wherein the operations further comprise generating the input data using a random number generator.

6. The system of claim 1, wherein the operations further comprise determining, based on the at least one output cost metric, a cost-model for the operator of interest based on the measured cost metric.

7. The system of claim 6, further comprising:
   a database execution engine;
   a benchmark framework communicatively coupled to the database execution engine;
   and one or more databases, wherein:
      the benchmark framework receives the execution plan file, and forms the extended execution plan object;
      the benchmark framework performs the series of tests and outputs the measured cost metric;
      the input data is received from the one or more databases; and
      the benchmark framework determines the cost-model for the operator of interest based on the measured cost metric.

8. The system of claim 7, further comprising:
   a cost-based optimizer communicatively coupled to the database execution engine and configured to perform operations comprising:
      receiving a query request; compiling the received query request into an initial execution plan;
      using the compiled execution plan, identifying database parameters associated with the received query request;

identifying, based on the identified database parameters and using one or more cost-models associated with one or more operators of interest associated with the received query request, an optimum version of the one or more operators of interest to execute the query; and executing the received query request using the identified optimum version.

9. A computer program product comprising a non-transitory machine-readable medium storing instructions that, when executed by at least one programmable processor, cause the at least one programmable processor to perform operations comprising:

receiving an execution plan file that encodes a query execution plan, the execution plan file utilizing at least one operator of interest and further utilizing other actions separate from the at least one operator of interest;

forming, based on the execution plan file, an execution plan object by modifying the execution plan file, such that the at least one operator of interest is isolated from the other actions, wherein the modifying includes replacing at least one of the other actions corresponding to a table scan with a first dummy operator including at least one pointer identifying input data for the first dummy operator;

performing a series of tests executing an extended execution plan object, the extended execution plan object formed by modifying one or more dummy operators in the execution plan object by replacing at least the at least one pointer with the input data, the series of tests comprising:

receiving the input data identified by the at least one pointer in the extended execution plan object, executing the extended execution plan object using the received input data, measuring, based on the execution of the extended execution pan object, at least one cost metric representative of execution of the at least one operator of interest; and outputting the measured cost metric representative of execution of the at least one operator of interest at the database.

10. The computer program product of claim 9, wherein forming the extended execution plan object further comprises deserializing the execution plan file.

11. The computer program product of claim 9, wherein the modifying includes replacing at least another one of the other actions corresponding to a projection operator with a second dummy operator configured to receive data produced by the at least one operator of interest.

12. A method comprising:

receiving an execution plan file that encodes a query execution plan for a database, the execution plan file utilizing at least one operator of interest to be isolated during testing and further utilizing other actions separate from the at least one operator of interest;

forming, based on the execution plan file, an execution plan object by modifying the execution plan file, such that the at least one operator of interest is isolated from the other actions, wherein the modifying includes replacing at least one of the other actions corresponding to a table scan with a first dummy operator including at least one pointer identifying input data for the first dummy operator;

performing a series of tests executing an extended execution plan object, the extended execution plan object formed by modifying one or more dummy operators in the execution plan object by replacing at least the at least one pointer with the input data, the series of tests comprising:

receiving the input data identified by the at least one pointer in the extended execution plan object, executing the extended execution plan object using the received input data, measuring, based on the execution of the extended execution plan object, at least one cost metric representative of execution of the at least one operator of interest; and outputting the measured cost metric representative of execution of the at least one operator of interest at the database.

13. The method of claim 12, wherein the cost metric is execution time of the extended execution plan object.

14. The method of claim 12, further comprising generating the input data using a random number generator.

15. The method of claim 12, further comprising determining, based on the at least one output cost metric, a cost-model for the operator of interest based on the measured cost metric.

16. The method of claim 12, wherein the modifying includes replacing at least another one of the other actions corresponding to a projection operator with a second dummy operator configured to receive data produced by the at least one operator of interest.

* * * * *